(12) United States Patent
Dilts et al.

(10) Patent No.: US 10,588,261 B2
(45) Date of Patent: Mar. 17, 2020

(54) RESIDUE HANDLING SYSTEM FOR AN AGRICULTURAL HARVESTER

(71) Applicant: CNH Industrial America LLC, New Holland, PA (US)

(72) Inventors: Mark D. Dilts, New Holland, PA (US); Nathan E. Isaac, Lancaster, PA (US); Austin L. Jackson, East Earl, PA (US); Cooper W. Linde, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/479,766

(22) Filed: Apr. 5, 2017

(65) Prior Publication Data

US 2017/0202142 A1    Jul. 20, 2017

Related U.S. Application Data

(62) Division of application No. 14/325,679, filed on Jul. 8, 2014, now Pat. No. 9,635,813.

(51) Int. Cl.
*A01F 12/40* (2006.01)
*A01F 29/02* (2006.01)
(Continued)

(52) U.S. Cl.
CPC .......... *A01F 12/40* (2013.01); *A01D 41/1243* (2013.01); *A01F 29/02* (2013.01);
(Continued)

(58) Field of Classification Search
CPC .......... A01F 12/40; A01F 29/02; A01F 29/04; A01F 2015/107; A01D 41/1243
See application file for complete search history.

(56) References Cited

U.S. PATENT DOCUMENTS

| 2,626,159 A | 1/1953 | Thompson |
| 3,350,017 A | 10/1967 | Howell et al. |

(Continued)

FOREIGN PATENT DOCUMENTS

| DE | 8810123 U1 | 9/1988 |
| DE | 69215682 T2 | 6/1997 |

(Continued)

OTHER PUBLICATIONS

Extended European Search Report for EP15175968.5, dated Nov. 15, 2017 (13 pages).

*Primary Examiner* — Alicia Torres
(74) *Attorney, Agent, or Firm* — Patrick M. Sheldrake; Peter K. Zacharias

(57) ABSTRACT

An agricultural harvester includes a chassis and a residue handling system carried by the chassis. The residue handling system includes a set of rotating knives disposed in a housing, a first set of counter-knives, and a residue pivoting platform and/or a second set of counter-knives. Crop residue travels through the system in a residue flow direction. The first set of counter-knives are configured to enter the housing proximate to the set of rotating knives. The residue pivoting platform is positioned proximate to the first set of counter-knives in an upstream direction relative to the crop residue flow direction. The second set of counter-knives are configured to enter the housing proximate to the set of rotating knives. The second set of counter-knives are in a downstream direction relative to the crop residue flow from at least one of the residue pivoting platform and the first set of counter-knives.

6 Claims, 8 Drawing Sheets

(51) Int. Cl.
  *A01F 29/04* (2006.01)
  *A01D 41/12* (2006.01)
  *A01D 41/06* (2006.01)
  *A01F 7/06* (2006.01)
  *A01F 12/44* (2006.01)
  *A01F 12/46* (2006.01)
  *A01F 12/60* (2006.01)

(52) U.S. Cl.
  CPC .............. *A01F 29/04* (2013.01); *A01D 41/06* (2013.01); *A01F 7/06* (2013.01); *A01F 12/446* (2013.01); *A01F 12/46* (2013.01); *A01F 12/60* (2013.01)

(56) References Cited

U.S. PATENT DOCUMENTS

| | | | |
|---|---|---|---|
| 4,077,573 A | 3/1978 | Kersey et al. | |
| 5,928,079 A | 7/1999 | Roberg | |
| 5,928,080 A | 7/1999 | Jakobi | |
| 5,974,776 A | 11/1999 | Prellwitz | |
| 6,152,820 A | 11/2000 | Heidjann et al. | |
| 6,354,938 B1 * | 3/2002 | Schrattenecker | A01F 12/40 241/47 |
| 6,616,528 B2 | 9/2003 | Wolters et al. | |
| 6,699,121 B2 * | 3/2004 | Bognar | A01F 12/40 460/112 |
| 6,908,379 B2 | 6/2005 | Gryspeerdt et al. | |
| 7,544,127 B2 | 6/2009 | Dow et al. | |
| 7,862,413 B2 | 1/2011 | Isaac et al. | |
| 8,187,064 B2 | 5/2012 | Schlesser et al. | |
| 2003/0109294 A1 | 12/2003 | Wolters et al. | |
| 2010/0291982 A1 * | 11/2010 | Isaac | A01F 12/40 460/112 |

FOREIGN PATENT DOCUMENTS

| | | | |
|---|---|---|---|
| DE | 19722793 A1 | 12/1998 | |
| DE | 19823489 A1 | 12/1999 | |
| DE | 102007011374 A1 | 9/2008 | |
| EP | 0077474 A1 | 9/1982 | |
| EP | 0415419 A2 * | 3/1991 | ............. A01F 12/40 |
| EP | 0538599 A2 | 4/1993 | |
| EP | 1461994 A1 | 9/2004 | |
| JP | H08214680 A | 8/1996 | |

* cited by examiner

RESIDUE HANDLING SYSTEM FOR AN AGRICULTURAL HARVESTER

CROSS REFERENCE TO RELATED APPLICATION

This application is a divisional of U.S. patent application Ser. No. 14/325,679, entitled "Residue Handling System for an Agricultural Harvester" and filed Jul. 8, 2014, the contents of which are incorporated herein by reference.

BACKGROUND OF THE INVENTION

1. Field of the Invention

The present invention relates to agricultural harvesters such as combines, and, more particularly, to the residue handling systems of agricultural harvesters.

2. Description of the Related Art

An agricultural harvester known as a "combine" is historically termed such because it combines multiple harvesting functions with a single harvesting unit, such as picking, threshing, separating and cleaning. A combine includes a header, which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan, which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

In common harvesting operations where a combine is used to cut or pick up crop while traveling through a field, it is generally desired to leave the residue in a compact windrow for eventual pickup, or for it to evenly distribute the residue or material other than grain (MOG) evenly across the entire cut width. Returning the material to the ground provides nutrients for future crops. It is important that MOG be properly processed prior to being spread so that the MOG is quickly assimilated into the nutrient base of the soil.

What is needed in the art is an adjustable residual handling system that provides a wide range of optional treatments to the MOG and is cost effective to produce.

SUMMARY OF THE INVENTION

The present invention provides an apparatus that impacts the flow and even orientation of the MOG as it is being processed in the residual handling system.

The invention in one form is directed to an agricultural harvester, including a chassis and a residue handling system carried by the chassis. The residue handling system includes a set of rotating knives disposed in a housing, a first set of counter-knives, and a residue pivoting platform and/or a second set of counter-knives. Crop residue travels through the system in a residue flow direction. The first set of counter-knives are configured to enter the housing proximate to the set of rotating knives. The residue pivoting platform is positioned proximate to the first set of counter-knives in an upstream direction relative to the crop residue flow direction. The second set of counter-knives is configured to enter the housing proximate to the set of rotating knives. The second set of counter-knives are in a downstream direction relative to the crop residue flow from at least one of the residue pivoting platform and the first set of counter-knives.

The invention in another form is directed to a residue handling system that includes a set of rotating knives disposed in a housing, a first set of counter-knives, and a residue pivoting platform and/or a second set of counter-knives. Crop residue travels through the system in a residue flow direction. The first set of counter-knives is configured to enter the housing proximate to the set of rotating knives. The residue pivoting platform is positioned proximate to the first set of counter-knives in an upstream direction relative to the crop residue flow direction. The second set of counter-knives is configured to enter the housing proximate to the set of rotating knives. The second set of counter-knives are in a downstream direction relative to the crop residue flow from at least one of the residue pivoting platform and the first set of counter-knives.

An advantage of the present invention is that allows for a wide range of treatment options of the residual material.

Another advantage of the present invention is that it causes the MOG to stall as it moves allowing more effective chopping of the MOG.

Yet another advantage of the present invention is that it serves to present the straw (MOG) to the chopper in a plane that is more aligned with the axis elevation of the chopper, as compared to the prior art. This causes the MOG to pass into the rotating blades resulting in a sudden change in direction of the MOG as the MOG is chopped.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
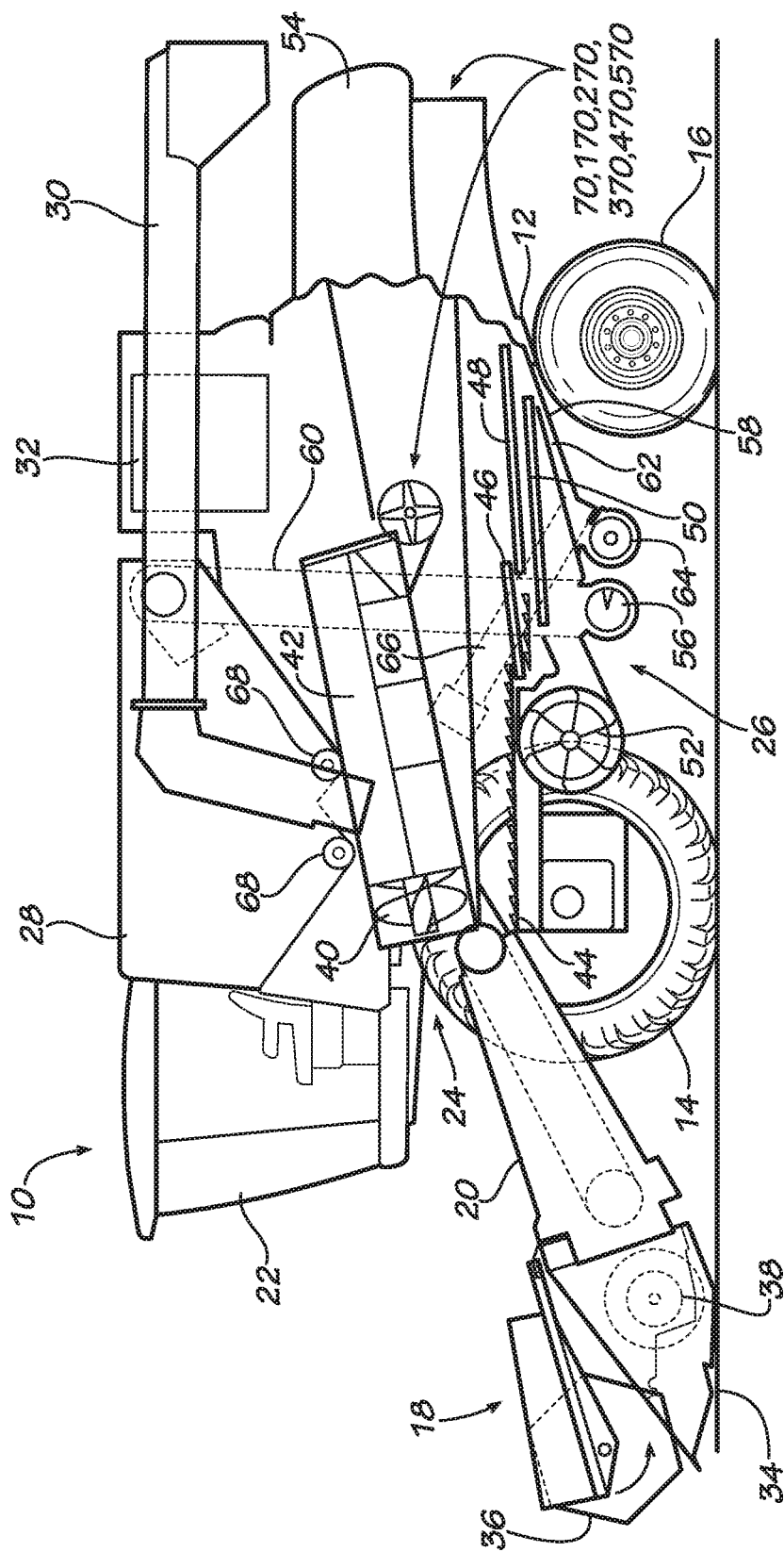
FIG. 1 is a side view of an embodiment of an agricultural harvester in the form of a combine which may include a residue handling system of the present invention.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half-tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain, which has been separated by the threshing and separating assembly 24, falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

A residue handling system 70 processes the MOG while combine 10 travels through a field. It is generally desired to leave the residue in a compact windrow for eventual pickup, or to evenly distribute the residue or material other than grain (MOG) evenly across the entire cut width. Returning the material to the ground provides nutrients for future crops. It is important that MOG be properly processed prior to being spread so that the MOG is efficiently assimilated into the nutrient base of the soil. Residue handling system 70 can be located at different locations as is generally depicted in FIG. 1, such that residue handling system 70 receives the MOG after grain has been removed by the threshing and separating system 24.

Now, additionally referring to FIGS. 2-8 there are shown various embodiments of the present invention, with residue handling system 70 (and its variants) including a chopper 72, having a housing 74, a set of rotating knives 76, sets of counter-knives 78 and (480), a residue pivoting platform 82 as well as actuators that separately move counter-knives 78 and (480), and residue pivoting platform 82 into and out of an interior cavity of housing 74. The various embodiments are noted with a multiple of 100 added to the reference numbers to reference items that are similar to those having some other multiple of 100 appended to the two-digit reference number. Not all of the items are necessarily contained in each embodiment. For example, while residue handling system 70 does not have a set of counter-knives "80", residue handling system 470 does have a set of counter-knives 480. Residue pivoting platform 82 is also referred to as a drop deck 82. In these various views rotating knives 76 of chopper 72 rotate in a counter-clockwise direction with the flow of MOG being generally left to right as it proceeds through residue handling system 70.

Counter-knives 78 and 480 are each a row of blades that are pivotally moved into and out of positions between the swinging path of rotating knives 76. Residue pivoting platform 82 is pivotally moveable so that it effectively becomes a part of the interior wall of housing 74, when platform 82 is retracted and can be pivotally moved away from the interior wall to thereby alter the pathway of MOG relative to chopper 72. Residue pivoting platform 82 is shown with a shred bar 84 connected to an end thereof. Shred bar 84 may have fingers, as seen in FIG. 3, with the fingers extending between the pathways of the blades of rotating knives 76.

Figure 2:
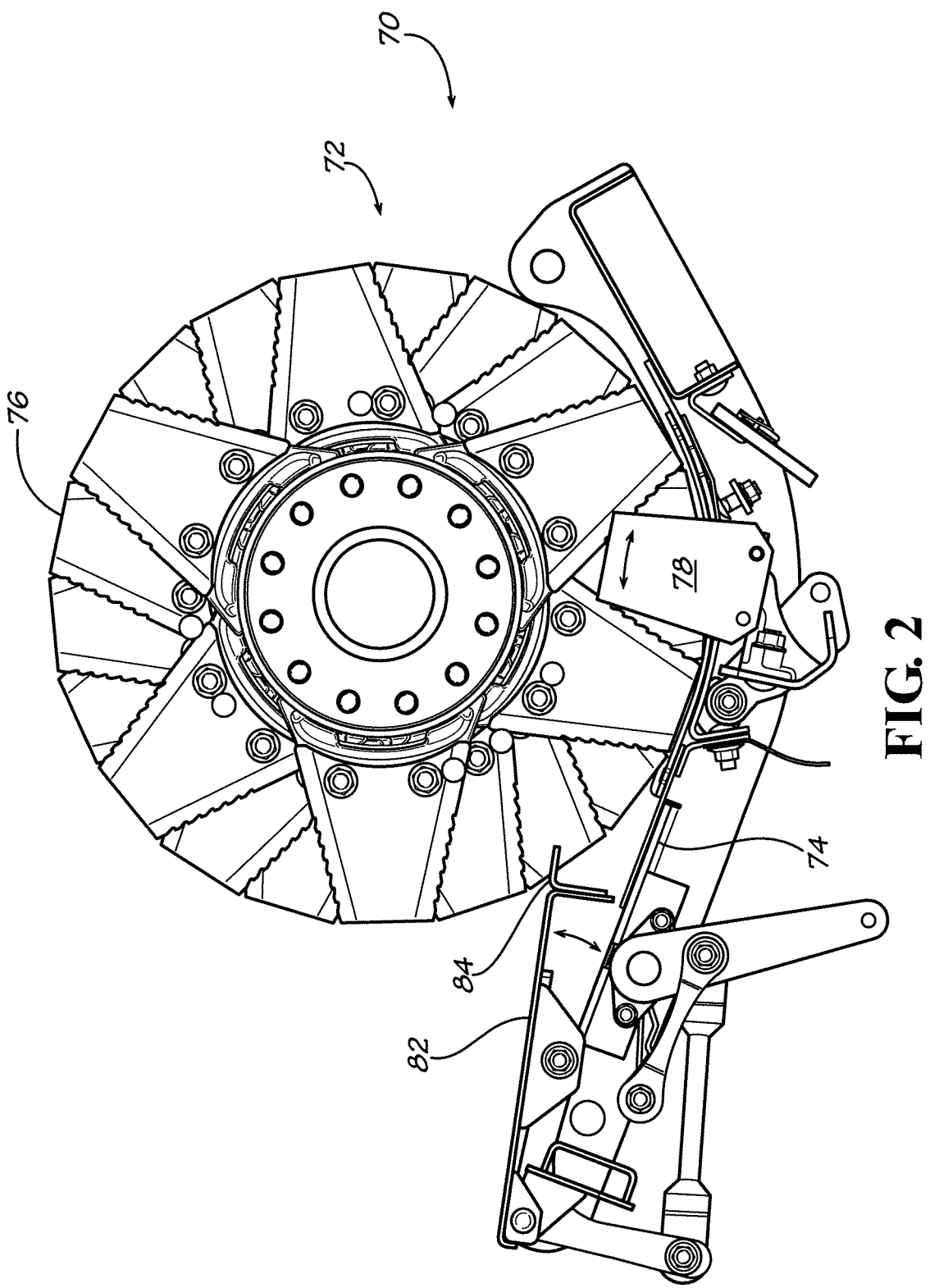
FIG. 2 is a side view of elements of an embodiment of an agricultural residue handling system of the present invention used in a harvester like that depicted in FIG. 1.
Figure 3:
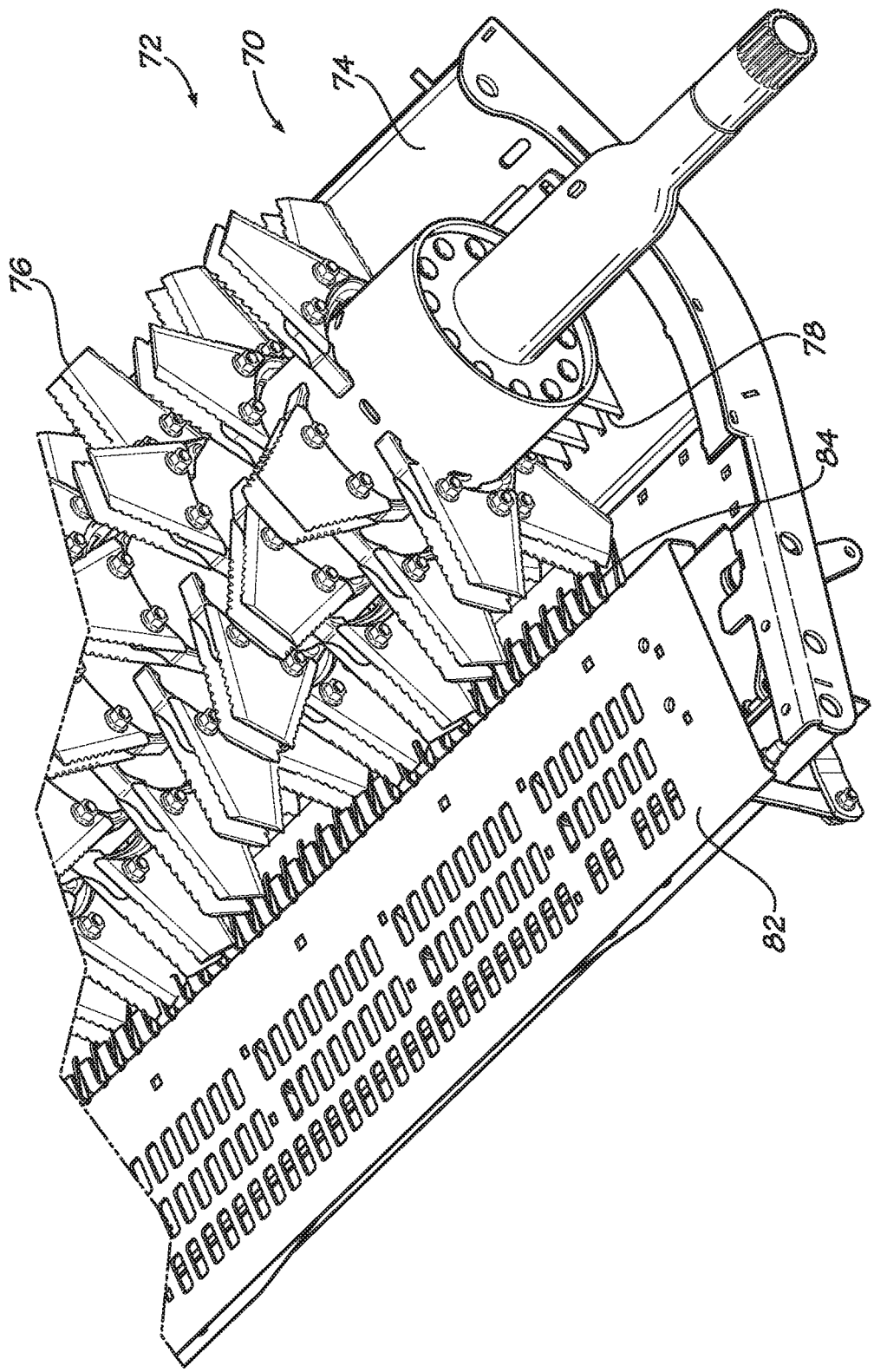
FIG. 3 is a perspective view of the residue handling system of FIG. 2.

As seen in FIGS. 2 and 3, counter-knives 78 and residue pivoting platform 82 are adjustably positioned within the cavity of housing 74. The positioning of counter-knives 78 and residue pivoting platform 82 are individually controlled, although they can also me coordinately controlled. For example, any pivotal position of counter-knives 78 and residue pivoting platform 82 is contemplated from 0% to 100% fully pivoted about their individual pivoting range. It is contemplated that discrete percentages of deployment may be selectable by an operator, such as 0%, 25%, 50%, 75% and 100%. In a like manner, in the other embodiments of the present invention having counter-knives 180 (see for example FIG. 4), they likewise can be individually controlled, or they can also me coordinately controlled with counter-knives 178 and residue pivoting platform 182.

Figure 4:
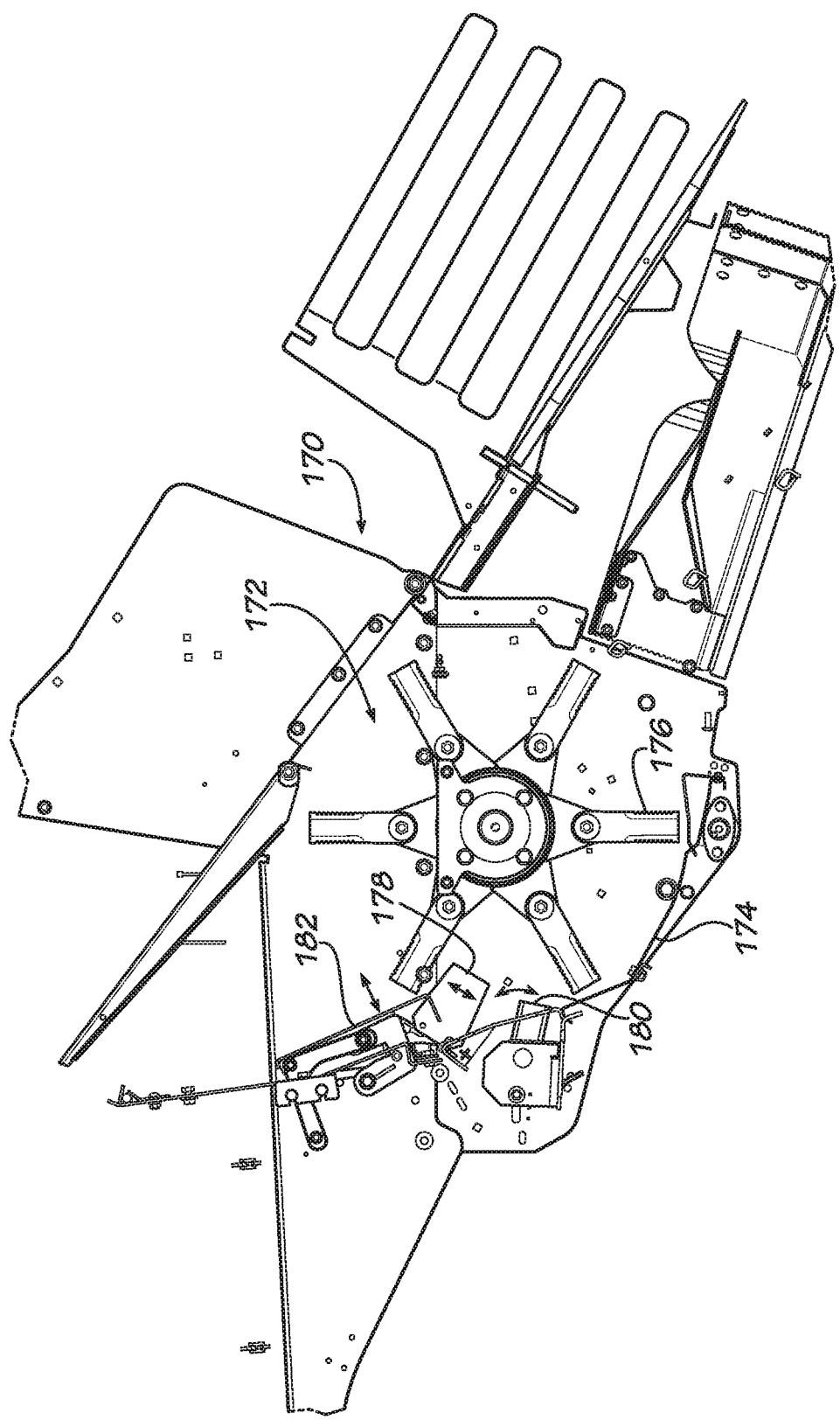
FIG. 4 is a side view of another embodiment of an agricultural residue handling system of the present invention used in a harvester like that depicted in FIG. 1.

In FIG. 4, residue handling system 170 has counter-knives 178 and 180 in close proximity with residue pivoting platform 182 positioned upstream from counter-knives 178 and 180. Counter-knives 178 can even be extendable with a mechanism that is tied to that which deploys residue pivoting platform 182 such that the counter-knives 178 and the pivoting platform 182 are mechanically linked. The trailing edge of residue pivoting platform 182 may have slots to accommodate the movement of counter-knives 178 relative to residue pivoting platform 182 such that the counter-knives 178 at least partially extend through the pivoting platform 182 by way of the slots, as shown in FIG. 4.

Figure 5:
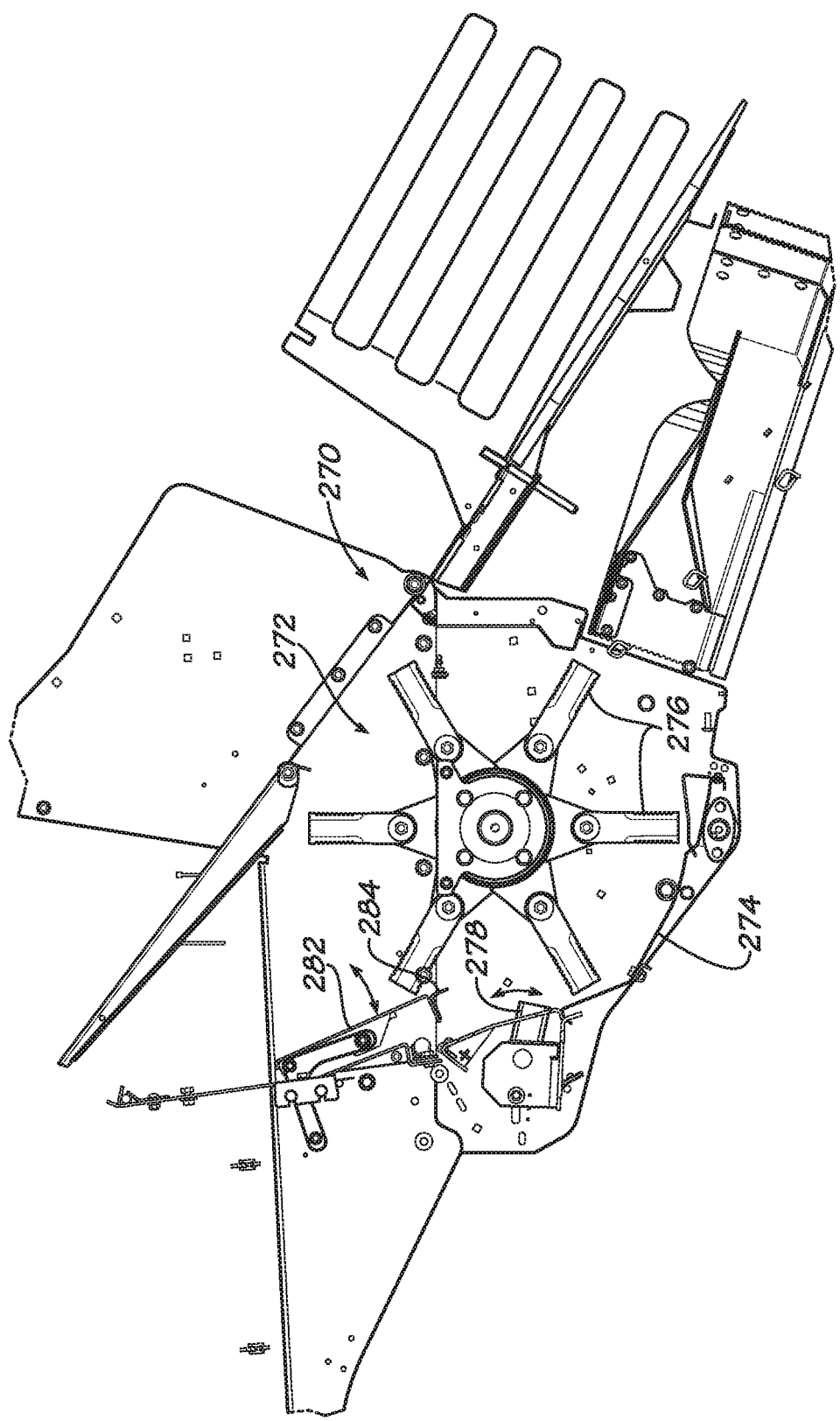
FIG. 5 is a side view of another embodiment of an agricultural residue handling system of the present invention used in a harvester like that depicted in FIG. 1.

In FIG. 5, residue handling system 270 has counter-knives 278 in close proximity with residue pivoting platform 282 positioned upstream from counter-knives 278. Residue pivoting platform 282 is substantially deployed within the cavity defined by housing 274. Here shred bar 284 is shown with fingers extending into the effective swing area of rotating knives 276. Counter-knives 278 are only partially deployed within housing 274.

Figure 6:
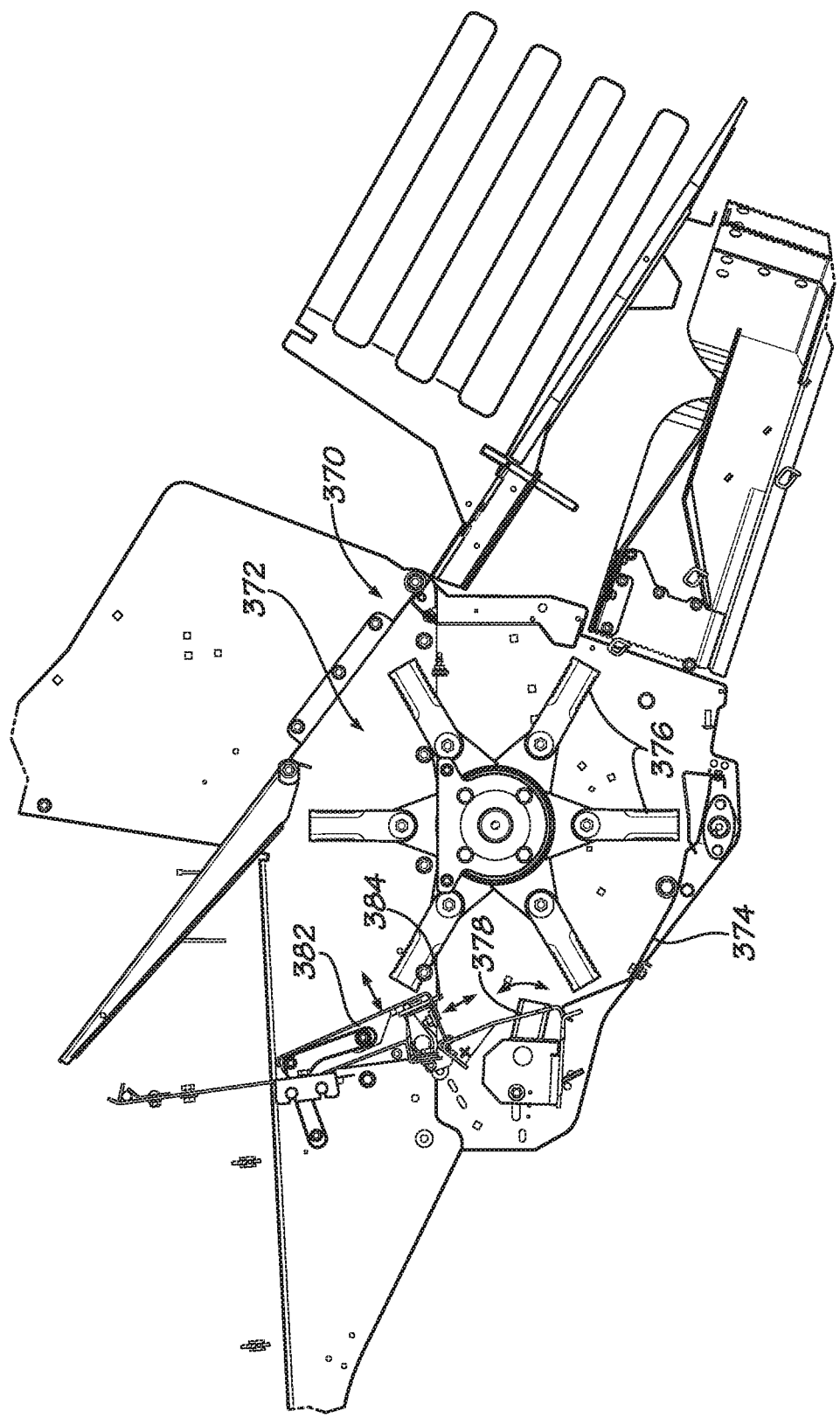
FIG. 6 is a side view of another embodiment of an agricultural residue handling system of the present invention used in a harvester like that depicted in FIG. 1.

In FIG. 6, residue handling system 370 has counter-knives 378 in close proximity with residue pivoting platform 382 positioned upstream from counter-knives 378. Residue pivoting platform 382 is substantially deployed within the cavity defined by housing 374. Here shred bar 384 is shown positioned close to the effective swing area of rotating knives 376. Counter-knives 378 are only partially deployed within housing 374.

Figure 7:
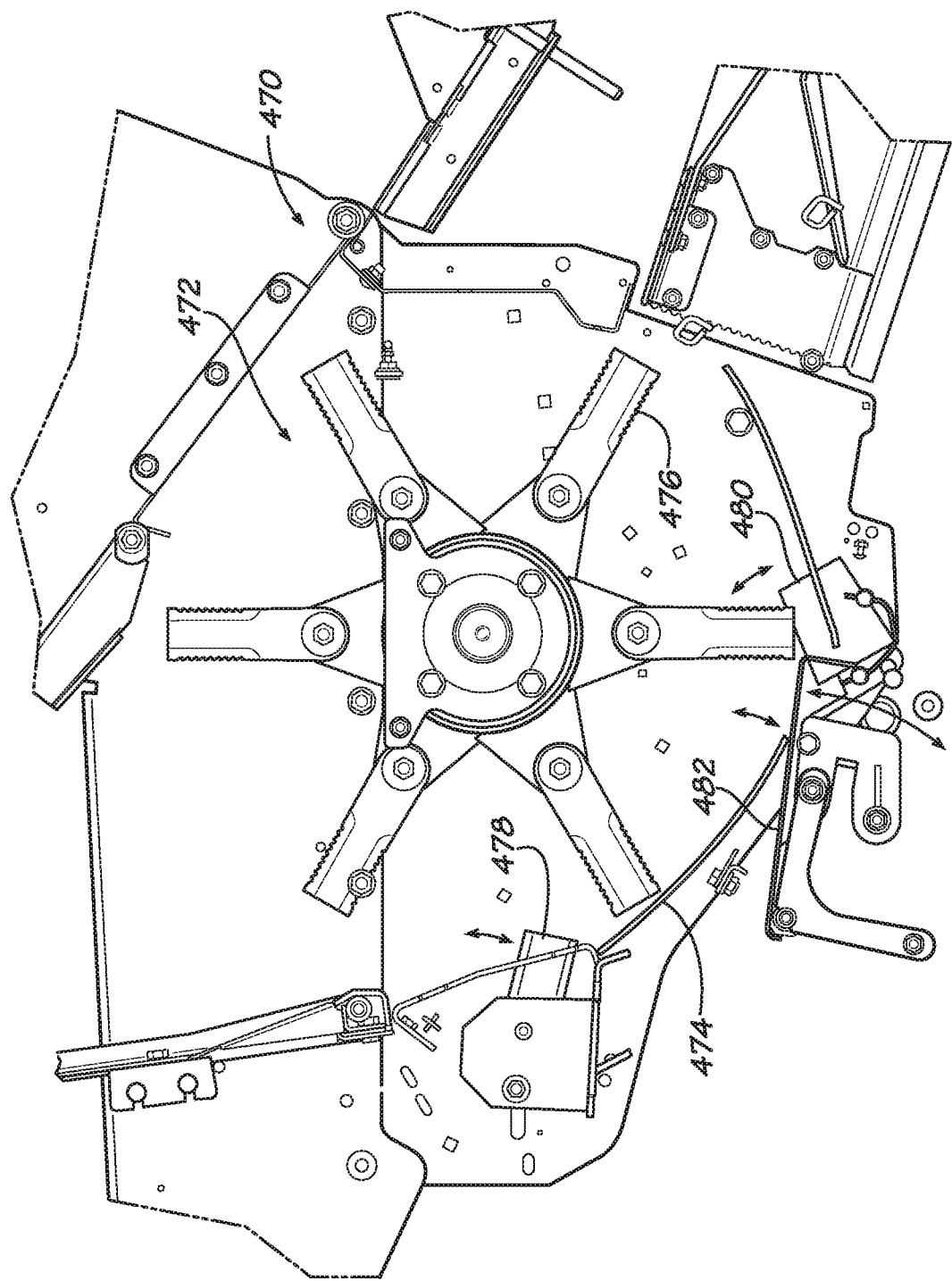
FIG. 7 is a side view of another embodiment of an agricultural residue handling system of the present invention used in a harvester like that depicted in FIG. 1.

In FIG. 7, residue handling system 470 has counter-knives 478 positioned upstream relative to residue pivoting platform 482, with counter-knives 480 being positioned downstream of, yet proximate to, residue pivoting platform 482. Residue pivoting platform 482 is shown deployed within the cavity defined by housing 474. Counter-knives 478 and 480 are only partially deployed within housing 474.

Figure 8:
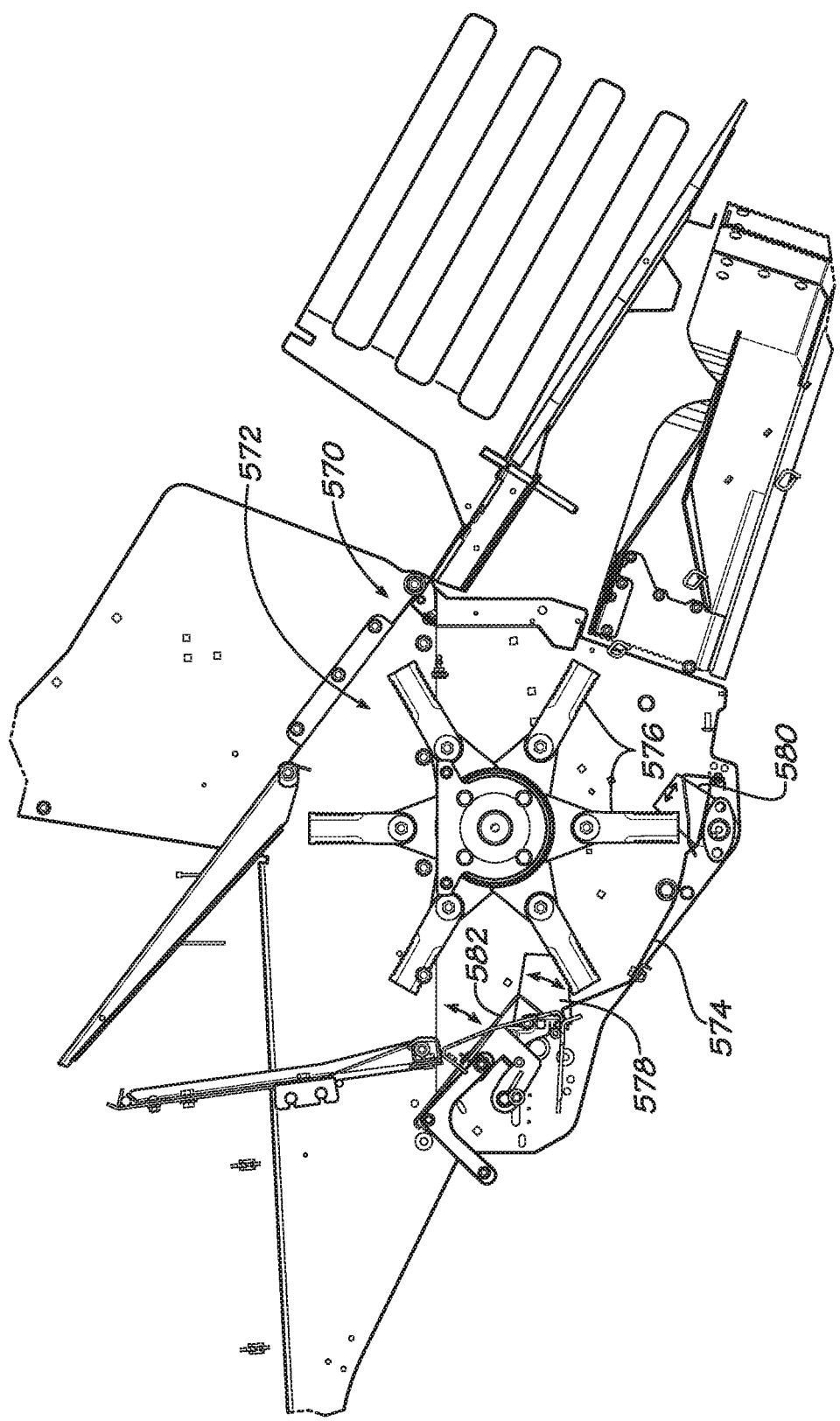
FIG. 8 is a side view of another embodiment of an agricultural residue handling system of the present invention used in a harvester like that depicted in FIG. 1.

In FIG. 8, residue handling system 570 has counter-knives 578 in close proximity with residue pivoting platform 582 positioned upstream from counter-knives 578 and 580. Residue pivoting platform 582 is substantially deployed within the cavity defined by housing 574. Counter-knives 578 and 580 are only partially deployed within housing 574. Counter-knives 580 are located substantially away from counter-knives 578 in this embodiment of the present invention.

Shred bar 84 can either be notched to allow blades to pass through, or it can be straight. Shred bar 84 may be fixed or it may be movable and adjustable.

The present invention advantageously interrupts the crop by stalling it so that the chopping operation has more effect on the MOG. The adjustability of the residue pivoting platform 82 and the positioning of the counter-knives allow the impact on the MOG to be enhanced or lessened as desired by the operator of combine 10. The space between the counter-knives allows the MOG to remix together and rearrange positions for additional chopping to occur. Residue pivoting platform 582 and counter-knives 578 and 580 can be fully retracted such that residue pivoting platform 582 conforms to the wall of housing 574 and counter-knives 578 and 580 are completely withdrawn from the interior space defined by housing 574 to thereby allow the MOG to pass through residue handling system 570 so that windrowing of the MOG takes place when desired. Counter-knives 578 and 580 have stone protection using a shear bolt, a slip-joint, or an auto-reset mounting. The present invention eliminates the need for a front or rear shred bar of the prior-art harvesters.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
   a chassis; and
   a residue handling system carried by said chassis, said residue handling system including:
      a housing;
      a set of rotating knives disposed in said housing, crop residue encountering the residue handling system, the crop residue moving in a crop residue flow direction;
      a first set of counter-knives configured to enter said housing proximate to said set of rotating knives;
      a residue pivoting platform positioned proximate to said first set of counter-knives in an upstream direction relative to the crop residue flow, said residue pivoting platform is configured for contacting said crop residue, said residue pivoting platform comprising an end which at least partially receives said first set of counter-knives such that said first set of counter-knives at least partially extend through said residue pivoting platform and extend beyond said end of said residue pivoting platform; and
      a second set of counter-knives, said second set of counter-knives being configured to enter said housing proximate to said set of rotating knives, said second set of counter-knives being in a downstream direction relative to the crop residue flow from at least one of said residue pivoting platform and said first set of counter-knives.

2. The agricultural harvester of claim 1, wherein said residue pivoting platform is positioned upstream of said first set of counter-knives and said second set of counter-knives.

3. The agricultural harvester of claim 1, wherein said residue pivoting platform is configured to be substantially flush with an inside wall of said housing when said residue pivoting platform is substantially retracted.

4. The agricultural harvester of claim 1, wherein said residue handling system includes said residue pivoting platform positioned upstream of said first set of counter-knives.

5. A residue handling system for use in an agricultural harvester, the residue handling system comprising:
   a housing;
   a set of rotating knives disposed in said housing, crop residue encountering the residue handling system, the crop residue moving in a crop residue flow;
   a first set of counter-knives configured to enter said housing proximate to said set of rotating knives;
   a residue pivoting platform positioned proximate to said first set of counter-knives in an upstream direction relative to the crop residue flow, said residue pivoting platform is configured for contacting said crop residue, said residue pivoting platform comprising an end which at least partially receives said first set of counter-knives such that said first set of counter-knives at least partially extend through said residue pivoting platform and extend beyond said end of said residue pivoting platform; and
   a second set of counter-knives, said second set of counter-knives being configured to enter said housing proximate to said set of rotating knives, said second set of counter-knives being in a downstream direction relative to the crop residue flow from at least one of said residue pivoting platform and said first set of counter-knives.

6. The residue handling system of claim 5, wherein said residue pivoting platform is positioned upstream of said first set of counter-knives and said second set of counter-knives.

* * * * *